Patented Oct. 16, 1951

2,571,315

UNITED STATES PATENT OFFICE 2,571,315

MODIFIED LARD AND PROCESS OF PRODUCING SAME

Robert J. Vander Wal, Chicago, and Leon A. Van Akkeren, Oak Park, Ill., assignors to Armour and Company, Chicago, Ill., a corporation of Illinois No Drawing. Application December 10, 1949, Serial No. 132,414

12 Claims. (Cl. 99—118)

This invention relates to a treatment of lard to improve its properties particularly for use in making cakes. The invention further deals with the production of cakes wherein the modified lard is used as the shortening.

This application is a continuation-in-part of our co-pending application Serial No. 710,408, now abandoned, for Modified Lard.

Essentially lard is rendered pork fat. It is prepared and marketed principally in its pure or unblended form. It may also be sold in a mixture of lard and vegetable fats, the vegetable fats being cottonseed oil, soybean oil, or the like. The vegetable oils used in such mixtures are customarily hydrogenated and impart stiffening quality or consistency to the shortening. Whether or not the lard is blended with vegetable oils the consistency and melting point is frequently adjusted by the addition to it of hydrogenated fats known in the industry as "flakes," such flakes being prepared by substantially complete hydrogenation of a quantity of fat. Melting point and consistency may also be adjusted by hydrogenation of the lard product itself. Alkali refining is sometimes employed in an attempt to improve the character of the product. Such a refining step may be practiced either in connection with the lard itself or in connection with the fats which are blended with the lard.

Though the characteristics of lard make it an excellent shortening for frying purposes, it has been regarded as inferior in some respects when used in baking. Cakes baked by the usual methods using lard as the shortening do not have as great a volume as cakes baked in the same manner using hydrogenated vegetable shortenings, all other conditions being equal.

If it were possible to so modify lard as to substantially improve the volume of cakes in which it is used, while still retaining its superior qualities for making pies, etc. such modified lard product would excel all other types of shortening for general use. We have set ourselves to this problem.

For convenience in comparing the cake volume-producing characteristics of different shortenings we have used a standard test procedure. This procedure involves the use of the shortening under test in baking a cake of the following formula:

1 pound fine granulated sugar
8 ounces shortening
½ ounce salt
8 ounces eggs
8 ounces milk
1 pound fine cake flour The conditions of mixing and baking are in each instance identical. The volume of the cake in milliliters divided by its weight in grams, multiplied by 100, gives a figure which is representative of the cake volume-producing characteristics of the shortening being tested. The cakes baked according to this standard procedure are modified pound cakes and hereinafter we will refer to the number arrived at according to the method above explained as the "pound cake volume" of the shortening used in the test.

The minimum pound cake volume of a high-grade hydrogenated vegetable shortening is about 250. Natural lard hardened with flakes (the usual lard of commerce) gives a pound cake volume averaging about 200. If the triglycerides of lard could be rearranged by some simple treatment whereby its pound cake volume approximates or exceeds the minimum requirements of the hydrogenated vegetable shortening, a greatly increased benefit would be derived from the available supply of lard.

An object of this invention is to rearrange the triglycerides of lard so as to increase its pound cake volume and improve its characteristics as a shortening. A further object is to provide an inexpensive process for the treatment of lard to bring about a rearrangement of the triglycerides therein whereby the pound cake volume thereof is greatly increased. Yet another object is to produce a cake of improved characteristics formed through the use of lard which has been modified structurally so as to respond unusually well in increasing the volume of a cake per pound weight thereof. Other specific objects and advantages will appear as the specification proceeds.

Lard differs from other fats as reflected by the results of its reactions with various rearrangement catalysts. It differs further in that it is excellent for the baking of pies but not as satisfactory for the baking of cakes in that it will not produce cakes of a high volume by the usual methods and for this reason it has had a somewhat unfavorable position as an all-around shortening. While it is essentially the same as many other edible, natural fats insofar as its component acids are concerned, nevertheless its response to treatment or rearrangement has been found to be unique and especially in the treatment which will be set out below for rearranging the constituents of the lard to convert it into a vastly improved and satisfactory shortening.

In carrying out our improved process we may heat lard in the presence of an alkali metal alcoholate at a temperature preferably in the neighborhood of 50° C. and not exceeding a temperature of 150° C. At the low temperature indicated, we find that an effective rearrangement of the lard molecules is brought about in response to a very short period of treatment. The temperature is critical and a table of temperatures which will be set out hereinafter will indicate the direct effect of the temperature upon the pound cake volume of the treated material.

At temperatures in the neighborhood of 150° C. a sharp drop in the pound cake volume of the lard was found and further the product had a tendency to darken and there was a charring of the lard. When a reaction temperature of 181° C. was used there was a distinct black charring of the lard and the volume of the pound cake made therefrom fell to a figure of 170. The preferred temperature is about 50 to 55° C., and the process was effective at temperatures up to 135° C. and a little above. Above 150° C. there was a falling off of the pound cake volume and in the color and quality of the product. The process can be operated at temperatures below 50° C.

Any alkali metal alcoholate may be used as a catalyst with satisfactory results. Some unusually effective examples may be set out as sodium methoxide or ethoxide. We have found sodium methoxide effective as a catalyst and it is desirable further because of the extremely small amount required. For example, from percentages varying between 0 and 1%, best results are obtained at about .5% and a diminishing curve of results is obtained when the quantity is greater than 1%.

The time of treatment may be varied widely, but we find that only a relatively short time, between 5 and 20 minutes, is necessary to produce the maximum in improved results. A treatment of only 5 to 10 minutes gives excellent results.

A specific example of the process may be set out as follows:

EXAMPLE I 750 grams of lard were filtered through a coarse filter paper and vacuum dried. The lard was heated to 55° C. and 3.75 grams (0.5%) of fresh sodium methoxide were added with rapid stirring. The mass was kept at 55° C. for one hour while stirring. 14 cc. of water were then added to destroy the catalyst and flocculate the sodium soap formed. (What remained was the modified lard, the sodium-fatty acid soap and the esters formed by the alcohol radical of the catalyst reacted with fatty acid radicals present in the lard.) The mass was kept well above the melting point and filtered through a bed of Hi-Flo Supercel. This removed the soap and most of the colored matter. Next, 8% of lard flakes were added to give the product a desired hardness and the resulting mixture was passed through a plasticizer. The mixture was allowed to stand 24 hours at 80° F. to reach a desired crystalline structure and after this "tempering" step, a pound cake was prepared using the above modified shortening. A pound cake volume of 274 was obtained.

EXAMPLE II

The same general procedure as Example I was followed with the exception that the temperature was raised from 55° to 90° C. during the course of the reaction and was held at 55° C. during most of this period. The pound cake volume in this example was 271.

EXAMPLE III—CONTROL

Control samples were used to check all the baking volumes. These controls consisted of the original lard not subjected to modification, but otherwise subjected to the same procedures. The pound cake volume of a typical example was 205.

A series of tests were made comparing the volumes of cakes baked using natural lard with the volume obtained under the same conditions using our modified lard. In this series of tests the same procedure was used as in Example I except that no flakes were added. The results of these tests are given in the following Table I:

*Table I*

POUND CAKE VOLUMES

| Natural Lard | Modified Lard |
|---|---|
| 159 | 225 |
| 157 | 238 |
| 156 | 241 |

The critical effect of temperature upon the results obtained is shown by the following table of reaction temperatures:

| Reaction Temperature | Pound Cake Volume |
|---|---|
| °C. | |
| 55 | 274 |
| 70 | 267 |
| 125 | 272 |
| 135 | 265 |
| 150 | 234 |
| 181 | 170 |

From the above table of reaction temperatures as correlated with the pound cake volume value of the product, it is apparent that best results are obtained at low temperatures and that after about 135° C. there is a definite falling off of the pound cake volume of the product. Above 150° C., there is a sharp falling off of the pound cake volume value. At 181° C., the pound cake volume was as low as 170 cc. and the product showed a distinct black charring. As shown by table above, the pound cake volume of the product dropped below the pound cake volume value of the original lard being treated at a temperature well below 200° C. and in the neighborhood of 180° C.

In each of the foregoing tests the modified shortening was incorporated into the standard cake batter and the cakes baked under the same controlled conditions.

The improvement in cake volume due to our special treatment is not confined to the pound cakes used in our standard comparative tests. The following Example IV illustrates the advantage gained in connection with a white layer cake:

EXAMPLE IV

Cakes were made according to the following formula for white layer cake:

510 grams granulated sugar
170 grams shortening
14 grams salt
284 grams egg whites
280 grams milk
453 grams flour
14 grams baking powder The batter was scaled to 13½ ounces in 8" layer pans and baked at 350° F. for approximately 17 minutes. The volume (in ml./100 gms.) of the cakes baked in this manner using our modified lard as the shortening was 275, while with ordinary or natural lard in the same procedure and using the same formula we obtained a volume of only 250.

What precise rearrangement of the triglyceride molecule occurs, we are unable to state. There is, of course, some forming of esters during catalysis but upon the removal of such residual esters, it was found that the modified lard had a pound cake volume just as good, if not better, than when such esters remained in the lard. While the formation of esters closely followed the improved characteristics of the lard, it is safe to say that improvement of the product was not due to the presence of such esters. Every indication is that the improvement is due to a definite rearrangement of the triglyceride molecule. For example, a mixture rich in trisaturated molecules (⅓ lard flakes and ⅔ olive oil) was treated with sodium methoxide. By test, this product was found to contain 3.5% trisaturated molecules per unit volume. An unmodified sample of the same mixture was found to contain 21.1% trisaturated molecules per unit volume. This is conclusive evidence that a rearrangement of the molecule has occurred.

Further evidence with respect to the rearrangement of the triglyceride molecule may be seen from cooling curves plotted from the cooling temperatures of modified and untreated lard. The cooling curve of the modified lard forms a relatively straight line curve while that of the untreated lard shows a "hump" in the 20 to 25° C. range. This hump is due to the heat of formation of crystals as the product solidifies. The fact that such change in the rate of cooling does not occur in the modified lard indicates that some sort of rearrangement of the molecule has occurred.

Though it is not essential to the process of rearrangement, we prefer to inactivate the catalyst in order to obtain the best product. This can be done conveniently by adding water to the liquid mixture.

It is desirable to remove the products of hydrolysis by filtering or centrifuging and to distill the esters formed during the reaction, but such removal is not essential to the operation of our rearrangement process.

We are not aware what, if any, changes occur in the sodium methoxide or other metal alcoholate after addition to the lard. However, in the present specification and claims we use the term "sodium methoxide" or "metal alcoholate" to designate the agent whether in its original state or as it may be modified after addition to the lard.

It is an advantage of our process that lard may be converted to an improved condition without the addition or removal of any selected fatty acid constituent. As we prefer to operate our process, the entire glyceride being treated is maintained in liquid phase during the treatment, and each portion of the shortening is subjected to the influence of the catalyst. In this way improved baking quality is accomplished while still retaining the better pie crust characteristics of lard.

Since it is possible that our process may be accompanied by a refining effect, we tried some tests comparing the cake volumes obtained using alkali refined lard with the volumes obtained using natural lard. The results of these tests are given in Table II as follows:

Table II

POUND CAKE VOLUMES

| Natural Lard Not Alkali Refined | Alkali Refined Lard |
|---|---|
| 151 | 158 |
| 157 | 151 |
| 155 | 158 |

As will be seen from the above table, the alkali refining operation gives very little, if any, improvement in cake volume. Certainly no improvement comparable to that obtained using our modified lard.

The process has been applied to other glycerides without substantially improving them while with lard a singular and unusual improvement is brought about. Various selected oils and fats were treated with sodium methoxide for 15 to 60 minutes at 50° to 80° C. in order to further rearrangement of the fatty acids on the triglyceride molecule. After rearrangement was completed, the catalyst was hydrolyzed with water and the product filtered. The materials were then tested according to the pound cake volume method already described herein.

The results disclosed that when a low temperature rearrangement process is applied to various representative triglycerides, a phenomenon resulting in an improved shortening occurs only with lard. Although rearrangement of the fatty acids on the triglycerides can be accomplished with other fats, we have not been able to recognize any accompanying factors which make them better shortenings, as measured by pound cake test. This type of improvement seems to be peculiar to natural lard. The natural lard while being improved greatly, as measured by the pound cake test, retains its excellent property for the baking of pie crusts.

In the foregoing tests, efforts to find an improvement in a rearranged "synthetic" lard were equally fruitless. The synthetic lard was prepared by mixing theoretical amounts of triglycerides which would produce the overall combination of fatty acids (as triglycerides) known to be present in lard in major quantities.

The following table sets forth the conditions and results of the tests described above:

| Shortening composition | Per Cent Rearrangement Catalyst | Time of Reaction | Temperature of Reaction °C. | Pound Cake Volume unrearranged Cc. | Pound Cake Volume rearranged Cc. |
|---|---|---|---|---|---|
| Cottonseed Oil + 20% Flakes [1] | 1 | 1 hour | 60 | 268 | 274 |
| Mutton Tallow | 1 | do | 60 | 196 | 202 |
| Menhaden Oil+10% Flakes [1] | 1 | 22 min | 75 | 268 | 261 |
| Edible Beef Tallow+8% Flakes [1] | 1 | 15 min | 70 | 219 | 200 |
| Horse Oil+10% Flakes [1] | 1 | 17 min | 55 | 290 | 297 |
| Hydrogenated Vegetable Oil (35% Soybean, 65% Cottonseed) | 0.5 | 30 min | 65 | 264 | 265 |
| Whale Oil+8% Flakes [1] | 0.5 | 15 min | 50 | 274 | 279 |
| Chicken Fat+10% Flakes [1] | 1.0 | 1 hour | 60 | 275 | 272 |
| Ordinary Lard (Prime Steam = all fat except Leaf Fat of Hog) | 0.5 | 30 min | 65 | 150 | 233 |
| Killing Lard (Belly Fat of Hog) | 0.5 | 1 hour | 73 | 172 | 250 |
| "Synthetic" Lard—37½% Beef tallow, 32½% Olive Oil, 25% Cottonseed Oil, 5% (Stearic Acid as "Flakes") Approximate Fatty Acid Composition of Lard | 1 | 1 hour | 60 | 231 | 226 |

[1] The lard "flakes" (hydrogenated lard I. V. 1.5) were added to the various fats after the rearrangement process was carried out. Sufficient flakes were added as a means to give the proper working consistency for preparing a pound cake.

It will be noted from the foregoing that ordinary or natural lard responded to the process by a great increase in the pound cake volume while substantially no response in this respect was found in the other material suggested with the same process.

While in the foregoing description, we have set forth one embodiment of the invention by way of example and in considerable detail, it will be understood that the details of the process may be modified widely by those skilled in the art without departing from the spirit of our invention.

We claim:

1. In a process for treating lard, the steps of heating the lard in liquid phase and in the presence of a metal alcoholate at temperatures about 50°–150° C.

2. In a process for treating lard, the steps of heating the lard in the presence of a metal alcoholate at a temperature between about 50 to 135° C.

3. In a process for treating lard, the steps of heating the lard in the presence of a metal alcoholate at a temperature in the neighborhood of 50 to 55° C.

4. In a process for treating lard, the steps of heating the lard in the presence of sodium methoxide at a temperature between about 50 and 135° C.

5. In a process for treating lard to rearrange the triglyceride molecule thereof, the steps of heating the lard in the presence of about 0.5% of sodium methoxide and at a temperature between about 50 and 135° C.

6. In a process for treating lard, the steps of heating the lard for a period not substantially exceeding 5 to 20 minutes in the presence of a metal alcoholate at a temperature between about 50 and 135° C.

7. In a process for treating lard, the steps of heating the lard for a period not substantially exceeding 5 to 20 minutes in the presence of sodium methoxide at a temperature between about 50 and 135° C.

8. In a process for treating lard to rearrange the triglyceride molecules thereof, the steps of heating the lard in the presence of sodium methoxide for a period in the neighborhood of 10 minutes and at a temperature in the neighborhood of 55° C.

9. In a process for treating lard, the steps of heating the lard in liquid phase to a temperature between about 50° to 135° C. and adding a metal alcoholate to the heated lard.

10. A shortening product comprising lard in which the triglyceride molecule has been rearranged in accordance with the process set out in claim 1.

11. A shortening product comprising lard in which the triglyceride molecule has been rearranged in accordance with the process set out in claim 3.

12. A shortening product comprising lard in which the triglyceride molecule has been rearranged in accordance with the process set out in claim 5.

ROBERT J. VANDER WAL.
LEON A. VAN AKKEREN.

REFERENCES CITED

The following references are of record in the file of this patent:

UNITED STATES PATENTS

| Number | Name | Date |
|---|---|---|
| 2,309,949 | Gooding | Feb. 2, 1943 |
| 2,442,531 | Eckey | June 1, 1948 |